United States Patent [19]

Parish

[11] 4,206,187

[45] Jun. 3, 1980

[54] PROCESS FOR REMOVING SULFUR DIOXIDE FROM GAS

[75] Inventor: William R. Parish, Lakeland, Fla.

[73] Assignee: Davy Powergas, Inc., Lakeland, Fla.

[21] Appl. No.: 944,625

[22] Filed: Sep. 21, 1978

Related U.S. Application Data

[63] Continuation of Ser. No. 875,456, Feb. 6, 1978, abandoned, which is a continuation of Ser. No. 637,954, Dec. 15, 1975, abandoned.

[51] Int. Cl.$^2$ .................... C01B 17/00; C01D 5/00; C01D 17/00
[52] U.S. Cl. .................... 423/242; 423/512 A; 423/551
[58] Field of Search .......... 423/242 A, 242 R, 244 A, 423/244 R, 512 A, 551

[56] References Cited

U.S. PATENT DOCUMENTS

| 3,653,812 | 4/1972 | Schneider et al. | 423/242 A |
| 3,971,844 | 7/1976 | Schneider | 423/242 A |

Primary Examiner—O. R. Vertiz
Assistant Examiner—Gregory A. Heller
Attorney, Agent, or Firm—Bernard & Brown

[57] ABSTRACT

There is disclosed a process for obtaining purer sodium sulfate from a mixture of solids containing sodium sulfate and sodium sulfite. The process involves contacting an aqueous slurry of the sulfate-sulfite mixture with a sulfur dioxide-containing gas under conditions which solubilize a significant amount of the sulfite as sodium bisulfite dissolved in the liquid aqueous phase. The remaining solid phase contains sodium sulfate of greater purity than in the mixture treated with sulfur dioxide. The mixture of sodium sulfate and sodium sulfite which is purified by the process may be obtained advantageously as a purge material from a process for removing sulfur dioxide from a gas stream.

11 Claims, 1 Drawing Figure

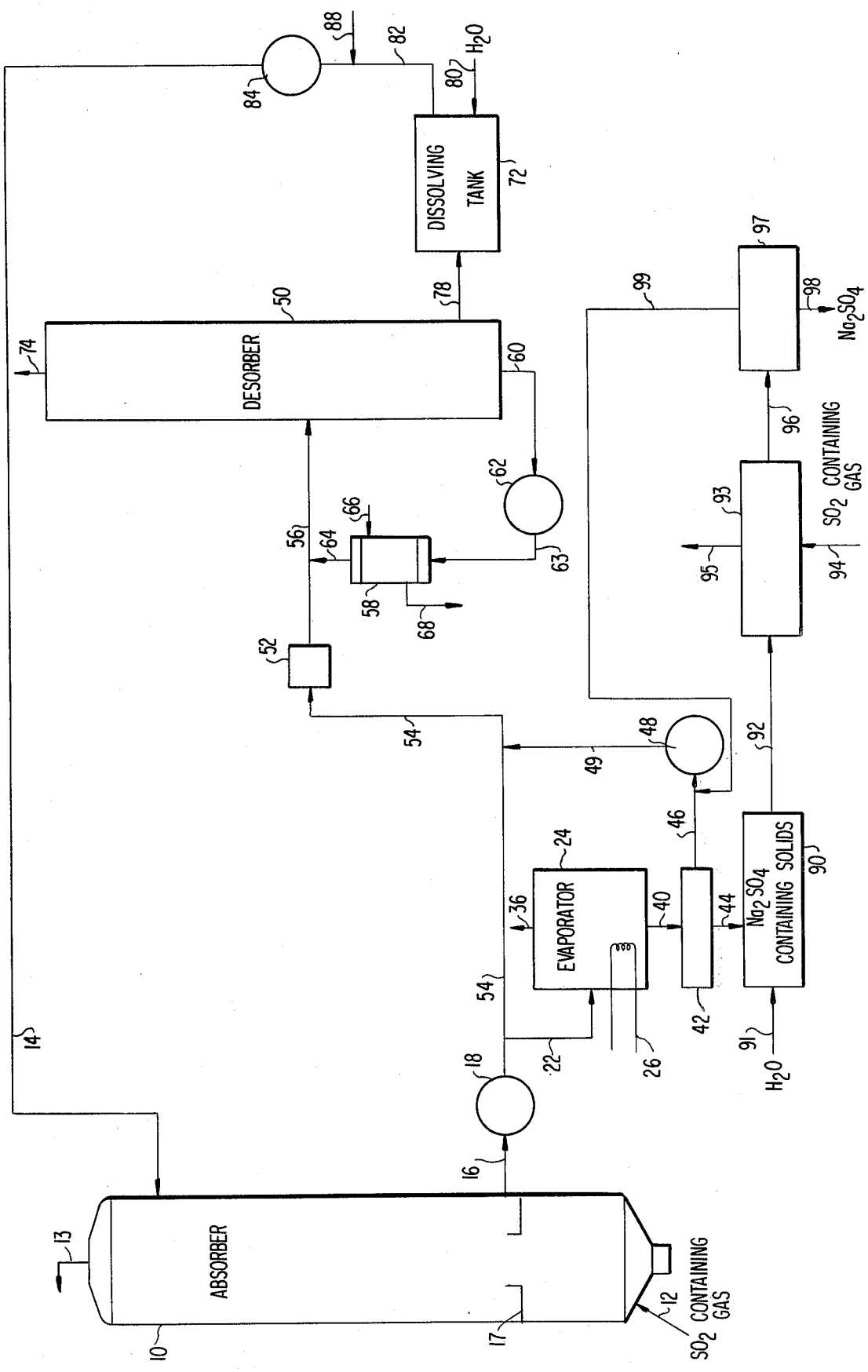

PROCESS FOR REMOVING SULFUR DIOXIDE FROM GAS

This is a continuation of application Ser. No. 875,456, filed Feb. 6, 1978, now abandoned, which in turn is a continuation of application Ser. No. 637,954, filed Dec. 5, 1975, now abandoned.

This invention relates to the purification of sodium sulfate contained in a mixture with sodium sulfite. More particularly, the invention pertains to a process involving contact of an aqueous slurry having sodium sulfate and sulfite in the solid phase, with a gas-containing sulfur dioxide under conditions which solubilize in the aqueous phase a significant amount of the sodium sulfite as bisulfite to provide a solid phase of increased sodium sulfate content. The sodium sulfate obtained may be of relatively high purity and may be suitable for ready sale as a sodium sulfate product or for preparation of such product. The process of the invention is particularly useful for recovering sodium sulfate from sodium sulfate-sulfite mixtures obtained as a purge material from systems for removing sulfur dioxide from gas streams.

Sulfur dioxide is a recognized pollutant of the atmosphere and is produced by oxidation of sulfur or sulfur-bearing materials. Sulfur dioxide is found in significant amounts as a constituent of various waste gases such as smelter gases, off-gases from chemical plants, and stack or furnace gases from coal or oil-burning furnaces such as are used in electric power plants. Although the concentration of sulfur dioxide in such gases is generally minor, e.g., from about 0.001 up to about 5 mole percent, and is frequently less than about 0.5 mole percent (less than about 1% by weight), the emission of sulfur-dioxide may be substantial, particularly in industrial applications due to the large amount of sulfur-bearing material being processed. For instance, a modern electric plant having a 1,350,000 kw. capacity will burn up to about 15,000 tons of coal per day. Despite the fact that the concentration of sulfur dioxide in the stack gases from the electric plant can be low, e.g., on the order of 0.2 to 0.3 mole percent, the total sulfur dioxide produced may be in the neighborhood of 1,000 tons per day. Similarly, significant amounts of sulfur dioxide are produced in utilization of other fuels which may bear sulfur.

Sulfur dioxide may be removed from gas streams by contact with an aqueous sodium sulfite solution to absorb sulfur dioxide and provide a spent absorbing solution richer in sodium bisulfite which can be treated to desorb sulfur dioxide and regenerate a sodium sulfite absorbing solution for reuse. The operation of an efficient and economical system for the removal of sulfur dioxide from gases by this absorption-desorption technique will be characterized not only in the efficiency of absorption of sulfur dioxide from the sulfur dioxide-containing gases, the efficiency of desorption of sulfur dioxide from the spent absorption solution, the purity of the sulfur dioxide product, and the minimization of the loss of sodium values from the system, but also in the ability to obtain any by-product from the system in a commercially acceptable form or in a form that is conducive to the preparation of marketable or useable products.

One by-product of such absorption-desorption system for removing sulfur dioxide from gases is sodium sulfate, and it is highly desirable to recover a portion of the expense of the sulfur dioxide removal procedure by the ultimate sale or use of this by-product. Although sodium sulfate has a number of commercial uses, material of fairly high purity must be obtained before it can be competitively marketed on a broad scale for uses such as in the manufacture of kraft paper, paper board, and glass; a filler in synthetic detergents; or in the processing of textile fibers and the like. Sodium sulfate by-product obtained from the sulfur dioxide removal process should be of sufficient purity to have market value or in a form which can be further purified without undue expense.

The gases treated for sulfur dioxide removal usually contain materials such as sulfur trioxide, oxygen, elemental iron, or the like, and, particularly when the gases containing sulfur dioxide are derived from the combination of fuel, other materials which may be present include the nitrogen oxides. At least some of these materials have an oxidizing effect and tend to convert sodium sulfite to sulfate, an inert material for purposes of the sulfur dioxide absorption-desorption process, and, consequently, sulfate build-up occurs. Since the sulfate is not regenerated to sulfite during the desorbing operation, it will remain as an inert material in the sulfur dioxide absorption-desorption system. A portion of the sulfate-containing solution can be purged from the system to prevent unduly large amounts of inert sulfate from accumulating in the absorbing solution. This purge has often been conducted subsequent to the desorption of the sulfur dioxide from the spent absorbing solution and prior to the addition of sodium ions to replace the sodium values which are lost through the purge. The purge material, however, contains substantial amounts of sulfite or bisulfite, along with the sulfate, and when the purge is discarded, an undue expense may occur due to the loss of sodium values from the system which must be replaced by the addition of soluble sodium compounds which are active in the absorption-desorption cycle. It is thus most desirable that any sodium sulfate purged be of higher purity to reduce the loss of useful sodium values from the absorption-desorption systems, and such purity will enhance the marketability of the sodium sulfate obtained if its purity can at least ultimately be increased sufficiently for commercial acceptance or use of the product.

There have been proposed several systems for purging sodium sulfate from the sulfur dioxide absorbing-desorbing system. Among these systems are ones involving, for example, low temperature crystallization or water evaporation to precipitate a solid phase in an aqueous absorption-desorption medium. The resulting solids can be separated by suitable liquid-solid separation equipment to remove the sulfate-containing solids from the absorption-desorption system, but the solids recovered may be of relatively little value if they contain unduly large amounts of sodium sulfite along with the sodium sulfate. There is, therefore, a substantial need for acceptable procedures for obtaining purer sodium sulfate from these and other mixtures of solids containing substantial amounts of sodium sulfite.

The present invention is directed to a process for purifying sodium sulfate in mixtures of solids containing sodium sulfite. The process involves contact of an aqueous slurry of the mixed solids with a sulfur dioxide-containing gas to solubilize sodium sulfite as sodium bisulfite dissolved in the aqueous liquid phase of the slurry. This solubilization is selective in the sense that a considerably greater proportion of the sulfite in the mixed solids is dissolved as bisulfite, compared with the proportion of sodium sulfate that is dissolved. As a result, the sulfur dioxide treatment effects a substantial purification of the sodium sulfate. The process is particularly adapted for use in conjunction with an absorption-desorption system for removal of sulfur dioxide from gases, since the feed gas or the separated sulfur dioxide-containing gas, with or without intermediate processing, can be employed to contact the mixed sodium sulfate-sodium sulfite solids to purify the sodium sulfate.

The mixture of sodium sulfate and sodium sulfite solids treated in accordance with this invention may be derived from any suitable source. The mixture generally contains a substantial amount of sodium sulfite, e.g., at least about 10 weight percent, and often at least about 25 weight percent, and up to about 90 or more weight percent, preferably up to about 75 weight percent, based on the total of the sodium sulfite and sodium sulfate present. Such mixtures can be obtained, for example, from the main desorption stage of, or as a purge material from, an absorption-desorption sulfur dioxide removal system employing an aqueous solution of sodium sulfite as the essential absorption medium as described herein and known in the art. The sodium sulfate content of such purged solids obtained by various treatments of materials withdrawn from the cyclic absorption-desorption systems, is usually at least about 30 weight percent of the total sulfate and sodium sulfite in the solids, and often this amount is at least about 50 weight percent, say about 65 to 85 weight percent. Even should the mixed solids treated for sodium sulfate purification initially contain a minor amount of sulfate, the solids of the slurry undergoing treatment in accordance with this invention can reach an intermediate stage in which they are predominantly sodium sulfate, based on the total sodium sulfate and sodium sulfite in the solid phase.

In the process of the present invention, the mixed solids are in the form of an aqueous slurry when contacted with the sulfur dioxide-containing gas and the amount of water present is generally sufficient to dissolve a major amount, and preferably substantially all, of the sodium bisulfite which is present or produced. In order to facilitate such dissolution and contact of the solids with the sulfur dioxide-containing gas the amount of water is usually sufficient to provide a flowable slurry. Often the amount of water is at least about 10 weight percent of the slurry, say up to about 80 weight percent or more, and preferably this amount is about 40 to 60 weight percent.

The concentration of sulfur dioxide in the gas used to purify sodium sulfate in accordance with the process of this invention is sufficient to provide the desired conversion of solid sodium sulfite to dissolved sodium bisulfite. Although gases containing a major volume percent of sulfur dioxide can be used, it may be economical in many situations to employ gases having only a minor amount of sulfur dioxide. For example, if the sodium sulfate purification process is used in conjunction with a system for separating sulfur dioxide from a gaseous stream, the separated sulfur dioxide could be used to treat the mixed sodium sulfate-sulfite solids. Alternatively, a waste gas stream may be employed as a source of sulfur dioxide, and such gases may contain less than about 5, often less than about 0.5, mole percent sulfur dioxide. The amount of sulfur dioxide in the treating gas may affect the length of time the treatment may be required to obtain the desired conversion of sodium sulfite to bisulfite, and the higher the sulfur dioxide content of the gas the shorter the period of treatment that may be required. Generally, the treating gas will contain at least about 0.01 volume percent of sulfur dioxide, and likely at least about 0.05 volume percent. Preferably, the sulfur dioxide content is at least about 0.1 up to about 2 volume percent. Various suitable sources of sulfur dioxide can be used, and aside from waste gas streams, other economically-feasible gases may include, as noted above, the sulfur dioxide-containing product gas obtained from an abosorption-desorption system for the removal of sulfur dioxide from a waste gas stream, which product or separated gas may be further treated, for instance, to increase its sulfur dioxide content.

The treatment of the mixed sulfate-sulfite solids in accordance with this invention may be conducted at various suitable conditions. The use of elevated temperatures, e.g., somewhat above ambient, may be employed to facilitate the reaction between the sulfur dioxide and sodium sulfite, and generally temperatures sufficient to provide the purified sodium sulfate in substantially anhydrous form are preferred. Thus temperatures of at least about 37° or 38° C. are employed with advantage, preferably at least about 40° C. is used to insure at least initially the production of a non-hydrated product. The temperature and other reaction conditions are preferably not such that there is undue or even substantial conversion of sodium bisulfite to sulfur dioxide, and often the temperature may not exceed about 110° C.; preferably, the temperature of the sulfur dioxide treatment of the mixed sodium sulfate-sulfite solids is about 40° to 75° C. The pressure used during the treatment may conveniently be atmospheric, but higher or lower pressures may be employed. The time of contact between the mixed solids and sulfur dioxide may vary and is sufficient to provide the desired conversion of sodium sulfite to bisulfite and obtain purer sodium sulfate. For example, the purity of the sodium sulfate in the solid phase may usually be increased by at least about 10 weight percent, often by at least about 25 weight percent, of the sulfate content of the mixed solids treated, based on total sulfate and sulfite. When the sulfate content of the solids treated with sulfur dioxide is high, e.g., above about 80 weight percent based on total sulfate and sulfite, the extent of purity increase may be relatively small and still be significant. The sulfate products obtained by the method of this invention often have a purity of at least about 75 or 80 weight percent, preferably at least about 90 or 95 weight percent, based on total sulfate and sulfite in the solid phase.

Although the mixed sodium sulfate-sulfite solids which are treated in accordance with this invention may be derived from various sources, it is a feature of the invention that the mixture be obtained from a cyclic absorption-desorption process employing an aqueous solution of sodium sulfite as the essential absorption medium for removing sulfur dioxide from gaseous streams, especially from waste gases as herein described. In such procedures, a lean aqueous absorbing solution having, for example, a major amount of sodium sulfite and usually minor amounts of sodium bisulfite and sodium sulfate based on the total weight of salts present, is used to absorb sulfur dioxide from a gas stream. Suitably the removal of sulfur dioxide may be at least about 95 volume percent or more. The spent absorbing solution is subjected to elevated temperatures, e.g., about 40° to 110° C., preferably about 60° to 95° C., to desorb the sulfur dioxide and produce an overhead gas containing sulfur dioxide and water. During the desorption a liquid or liquid-solid material is provided which can serve as the source of the absorbing solution recycled to the absorption stage of the process. The sulfur dioxide can be drawn-off and cooled or compressed to provide a liquid product or sent as a gas to a sulfuric acid plant or sulfur plant. It is preferred that the desorption process be conducted while precipitating solids from the spent absorption solution, which solids are composed of a major amount of sodium sulfite and a minor amount of sodium sulfate based on the total of these components. This type of operation is described in U.S. Pat. Nos. 3,607,037; 3,653,812; and 3,790,660, all of which are incorporated herein by reference.

When the desorption of sulfur dioxide is accomplished with concomitant formation of an undissolved solids or crystal phase, the desorption requires lesser amounts of heat. In such operations the amount of undissolved solids in the desorption zone is generally at least about 15 weight percent of the slurry undergoing decomposition or sulfur dioxide desorption. As described in U.S. Pat. No. 3,790,660 the amount of such solids is advantageously at least about 25 weight percent in order to alleviate difficulties of tube fouling when supplying heat to the desorption zone by passing the slurry through the tubes of an indirect heat exchanger. Preferably, the amount of undissolved solids is about 30 to 50 weight percent of the slurry undergoing decomposition. Quite importantly, when the amount of undissolved solids is sufficiently high, the sodium sulfite content of the slurry may be adequate for a portion of the total slurry to be combined with water to dissolve the solids, and the resulting solution used as the lean solution for absorbing the sulfur dioxide from the gas being treated in the absorption zone of the absorption-desorption system. This procedure avoids the costly step of removing sulfite-containing solids from the mother liquor.

All or a portion of the absorption-desorption medium cycling in the sulfur dioxide removal process can be treated to separate a material containing mixed sodium sulfate-sulfite solids. Preferably, the spent aqueous absorption medium containing a major amount of sodium bisulfite and usually minor amounts of sodium sulfite and sodium sulfate, based on the total weight of there components, serves as a source of the mixed sodium sulfate-sulfite solids treated in accordance with this invention. Typically, such spent solutions contain about 15 to 40 weight percent of sodium bisulfite, up to about 10 weight percent of sodium sulfite, about 1 to 10 weight percent of sodium sulfate, a small amount of sodium thiosulfate, and the essential balance water.

In the separation of the mixed sodium sulfate-sulfite solids from the cyclic absorption-desorption sulfur dioxide removal process, the desired mixed solids may be obtained as a liquid-solid mixture or in the form of solids containing little, if any, free water. Precipitation of the solids from the absorption-desorption medium can be accomplished by using one or more separation procedures such as evaporation of water or low temperature crystallization. The resulting slurry can be subjected to a liquid-solid separation procedure such as filtration or centrifugation to obtain an essentially solid phase and a mother liquor which can be charged to the absorption-desorption cyclic system. Preferably, the mother liquor is sent to the desorption operation since the liquor is relatively high in sodium bisulfite content. The mixed solids precipitate can be treated in accordance with the process of the present invention with or without preliminary drying. In preferred procedures the solids are initially precipitated in essentially anhydrous or non-hydrate form to facilitate handling, and any entrained water can be removed by drying or the solids may be self-drying as the result of the entrained water becoming associated with the solids as hydrates. In any event, the separated solids can be combined with any water needed to produce a water-solids mixture suitable for treatment in accordance with this invention. In an alternative operation, a liquid-solid mixture obtained in the precipitation of solids from the absorption-desorption medium, may be contacted with sulfur dioxide to purify sodium sulfate by the process of the present invention without separation of an essentially solid phase from the mixed liquid-solids slurry produced in the precipitation.

In one preferred embodiment, the method of this invention is conducted in conjunction with the purge of sodium sulfate from sulfur dioxide separation systems. As previously noted in such operations, there is formation of sodium sulfate which is undesirable due to its essential inertness in the abosrption-desorption cycle. Sulfate can be selectively removed from the system by treating at least a portion of the absorption-desorption medium, preferably aqueous spent absorption solution, to remove a sufficient amount of water to precipitate a significant, but limited, amount of solids in the medium. Thus the evaporation of water can be conducted in a manner to form up to about 10 or 20 weight percent crystals in the slurry. The operation is advantageously conducted at somewhat elevated temperatures, and preferably without undue formation of sulfur dioxide.

Temperatures which are advantageous for accomplishing this desired evaporation of water are sufficient to precipitate essentially anhydrous or non-hydrated sodium sulfate. These temperatures are usually at least about 37° C. or 38° C., and to ensure the precipitation of the desired solids the temperatures are conveniently at least about b 40° C., including about 40° to 110° C., preferably about 40° to 75° C. The choice of temperature may depend on the pressure employed, and the pressure may be ambient, reduced or elevated. Advantageously, the pressure is about 2 to 21 psia. The slurry obtained in the water removal operation can be subjected to a liquid-solid separation procedure to provide a separate, essentially solid phase which is fairly high in sulfate content. The separation can be done without reducing the temperature of the slurry, and the temperature may often be about 40° to 110° C., preferably about 40° to 75° C. The separated liquid phase or mother liquor can be charged to the absorption-desorption system, and preferably to the desorption zone.

The amount of solids formed in the water evaporation stage is generally sufficient to prevent undue build-up of sodium sulfate in the absorption-desorption system. Advantageously, sufficient sulfate is precipitated to be substantially equal to the amount of sulfate being formed in the absorption-desorption system while taking into account any sulfate that is removed from the system by other means. Also, the extent of solids formation may depend on the purity of the sulfate in the precipitated and separated solid phase, as well as the amount of the total absorption-desorption medium which is subjected to sulfate precipitation. Thus, up to the entire absorption-desorption medium may be treated for sulfate removal in which case the percentage of solids formed may be less than if only a portion of the cycling absorption-desorption medium is subjected to the sulfate precipitation treatment. Generally, as the percentage of solids formed in the medium decreases, the purity of the precipitated sulfate increases. As noted, the amount of solids formed may be up to about 10 or 20 weight percent of the absorption-desorption medium treated, and generally is at least about 1 weight percent. Preferably, the amount of solids formed is about 2 to 8 weight percent of the medium treated for water removal, but especially when the precipitation is accomplished while supplying sulfur dioxide-containing gas the amount of solids precipitated may in some instances be about 10 to 20 weight percent with advantage. Suitable precipitation operations are described in U.S. patent applications Ser. No. 630,503, filed Nov. 10, 1975 (refiled as Ser. No. 949,545 on Oct. 10, 1978) in the names of Norman E. Nicholson, John Scarlett and John Frederick Flintoff, herein incorporated by reference. Other procedures for obtaining mixed sodium sulfate-sodium sulfite solids are described in U.S. patent application Ser. No. 443,326, filed Feb. 19, 1974, now U.S. Pat. No. 3,971,844, in the name of Raymond T. Schneider, herein incorporated by reference.

The present invention will be further described by reference to the drawing which is a schematic flow diagram of a process employing the present invention in an absorption system using sodium sulfite for removal and recovery of sulfur dioxide from flue gas. Equipment such as valves, pumps, heat exchangers, surge tanks, and the like, which would be used in a commercial embodiment of the invention and in the operation of an absorption system, is not shown since it can be of conventional design and employed in accordance with practices well known in the art.

Referring to the drawing, sulfur dioxide-containing flue gas, which may, for example, contain about 1 mole percent sulfur dioxide, enters absorber vessel 10 by way of line 12 near the bottom thereof. Water or other aqueous liquid may be passed concurrently with the flue gas to a bed of column packing in the lower portion of vessel 10 to prescrub the gas to remove suspended solids such as fly-ash and relatively high water-soluble components, for instance, sulfur trioxide, from the flue gas.

The flue gas passes upwardly through absorber 10 through liquid-gas contacting means such as sieve trays and through a descending flow of lean absorbing solution which is supplied to vessel 10 through line 14. The lean absorbing solution contains sodium sulfite as the essential sulfur dioxide absorbing component. Absorber 10 may employ other types of liquid-gas contacting structures, such as packing, bubble caps, alternate ring and discs or the like. The lean absorbing solution in line 14 is often at a temperature at least about 40° C., up to about 110° C., preferably up to about 70° C. Flow rates of the aqueous absorbing solution through the absorption zone can be adjusted according to the sulfur dioxide concentration in the gas being treated, and the concentration of the sodium sulfite in the solution so that a major amount, e.g., up to about 95% or more, of the sulfur dioxide may be removed from the gas by reaction with the lean absorbing solution. The treated gas leaves absorber 10 by way of line 13. The spent absorbing liquid on the collecting tray 17 in the lower part of column 10 may be withdrawn by line 16.

The spent absorbing solution is transferred by pump 18 and line 54 to heater 52 and thence by line 56 to desorber 50. A portion or even all of the stream in line 54 containing sodium sulfate, as well as sodium sulfite and bisulfite, in solution is passed by line 22 to evaporator or dehydrator 24. Heat may be supplied to evaporator 24 by steam coil 26, and the added heat serves to cause the removaal of water from the sent absorbing solution and the precipitation of sodium sulfate-containing solids. The water and any sulfur dioxide in the vapor phase in evaporator 24 is removed by line 36.

A portion of the spent absorbing medium undergoing dehydration in evaporator 24 is withdrawn via line 40 and passed to crystal separator 42 which may be selected from conventional processing equipment for effecting separation of solids and liquids such as filters, including rotary filters, centrifuges clarifiers and other sedimentation equipment. Solids rich in sodium sulfate crystals and containing sodium sulfite can be removed by line 44, and the resulting liquid stream, having sulfate removed therefrom, can be sent via line 46, pump 48, lines 49 and 54, heater 52, and line 56 to desorber 50 for processing to desorb sulfur dioxide and regenerate the abosrbing solution.

In the desorber section of the system which can be operated in the manner shown in U.S. Pat. No. 3,790,660, is for convenience shown as a single stage desorber, but two or more stages may be used. The heated solution in line 56 is introduced into the desorber 50. The conditions of temperature, pressure, and residence time in desorber 50 are so maintained as to effect the desired decomposition of sodium bisulfite, evaporation of sulfur dioxide and water, and precipitation of sodium sulfite-containing crystals as described above and in said patent.

To supply heat to desorbing vessel 50, a recycle stream is heated in heat exchanger 58. In order to effect heating in vessel 50, the slurry in the messel is withdrawn by line 60, and passed through pump 62, line 63, metallic tubes of heat exchanger 58 and back to vessel 50 by way of lines 64 and 56. Steam is introduced to heat exchanger 58 through line 66 as the prime energy source for the desorption zone. The condensate (water) from heat exchanger 58 is removed through line 68. The sulfur dioxide and water vapors from desorber 50 are removed by line 74. A portion of the slurry in desorber 50 is passed to dissolving tank 72 by way of line 78. Since water has been removed from the absorption solution during desorption, make-up water, for example, from rectification (not shown), is supplied to tank 72 through line 80. The solution formed in dissolving tank 72 passes through line 82, pump 84, and line 14 to absorber 10. Make-up sodium ion, which may be an aqueous sodium hydroxide or carbonate solution, is added to line 82 through line 88.

Sodium sulfate-containing solids withdrawn from separator 42 by line 44 are combined in vessel 90 with water from line 91 and the resulting slurry is passed by line 92 to gas-liquid contacting vessel 93. Sulfur dioxide-containing gas is charged to vessel 93 by line 94, and off-gases leave the vessel through line 95. The sulfur dioxide serves to convert sulfite in the slurry to bisulfite in solution in the liquid phase. The resulting slurry passes by line 96 to crystal separator 97, and purified sodium sulfate is removed by line 98. The resulting mother liquor containing sodium bisulfite is sent by line 99, to line 46, and thence to desorber 50 for sulfur dioxide recovery.

The following examples will further illustrate the present invention, but do not limit it.

Tests were conducted on solution which simulated the composition of spent absorber solutions obtained in an operation of the type shown in the drawings. The solutions were evaporated in a beaker at atmospheric pressure until the stated solid content was obtained. The slurry was filtered through a hot buchner funnel and samples of the wet crystals and of the mother liquor were taken for analysis. The composition of the crystals was thus determined, see first dry crystals analyses in Table I. Water was added to the wet crystals to give a slurry containing 40-42% water. This slurry was maintained at approximately 40° C. to 50° C., for 80 to 120 minutes while gaseous $SO_2$ was bubbled through it. The crystals were then separated from the mother liquor on a buchner funnel and both fractions were analyzed. The results are in Table I.

TABLE I

|  | Test No. |  | 1 | 2 | 3 | 4 | 5 |
|---|---|---|---|---|---|---|---|
| SPENT ABSORBER SOLUTION | $Na_2SO_3$ | % wt. | 5.9 | 5.9 | 6.0 | 5.9 | — |
| | $NaHSO_3$ (calc. as $Na_2S_2O_5$) | " | 19.3 | 19.7 | 19.5 | 19.0 | — |
| | $Na_2SO_4$ | " | 8.1 | 7.9 | 7.8 | 7.5 | — |
| | $Na_2S_2O_3$ | " | 0.3 | 0.3 | 0.3 | 0.3 | — |
| | NaCl | " | 0.2 | 0.1 | 0.1 | 0.1 | — |
| | $H_2O$ (by diff) | " | 65.8 | 66.1 | 66.3 | 67.4 | — |
| FIRST FILTRATE MOTHER LIQUOR | $Na_2SO_3$ | % wt. | 7.4 | 6.1 | 8.1 | 7.5 | — |
| | $NaHSO_3$ (calc. as $Na_2S_2O_5$) | " | 23.8 | 31.4 | 27.7 | 22.1 | — |
| | $Na_2SO_4$ | " | 7.1 | 4.3 | 4.7 | 7.6 | — |
| | $Na_2S_2O_3$ | " | 0.4 | 0.6 | 0.5 | 0.4 | — |
| | NaCl | " | 0.2 | 0.2 | 0.2 | 0.1 | — |
| | $H_2O$ (by diff) | " | 61.1 | 57.4 | 58.8 | 62.3 | — |
| | 2 wt/wt | | | | | | |
| FIRST DRY CRYSTALS | $Na_2SO_3$ | % wt. | 33.3 | 47.9 | 39.6 | 18.2 | 58.8[1] |
| | $NaHSO_3$ (calc. as $Na_2S_2O_5$) | " | 2.3 | 0.8 | Nil | Nil | 0.4 |
| | $Na_2SO_4$ | " | 64.0 | 51.3 | 60.4 | 81.8 | 27.8 |
| | $Na_2S_2O_3$ | " | 0.1 | Nil | Nil | Nil | Trace |
| | NaCl | " | 0.3 | Trace | Nil | Nil | 0.0 |
| | $H_2O$ | " | | | | | 13.0 |
| Solids[2] | | | 5.0 | 19.92 | 11.7 | 1.9 | |
| CONDITIONS $SO_2$ TREATMENT | $SO_2$ Used g | | 115 | 184.7 | 140.2 | 142.5 | 99.0 |
| | Time min | | 90 | 120 | 90 | 80 | 80 |
| | Temp. °C. | | 40 | 40 | 40 | 43 | 50 |
| SECOND FILTRATE MOTHER LIQUOR | $Na_2SO_3$ | % wt. | Nil | 2.6 | 3.9 | Nil | 6.3 |
| | $NaHSO_3$ (calc. as $Na_2S_2O_5$) | " | 25.4 | 31.4 | 26.8 | 26.5 | 29.0 |
| | $Na_2SO_4$ | " | 13.3 | 5.0 | 6.0 | 7.7 | 5.7 |
| | $Na_2S_2O_3$ | " | Trace | Trace | 0.1 | 0.4 | Trace |
| | NaCl | " | 0.1 | Trace | 0.1 | 0.1 | — |
| | $H_2O$ (by diff) | " | 61.2 | 61.0 | 63.1 | 65.3 | 59.0 |
| SECOND DRY CRYSTALS | $Na_2SO_3$ | % wt. | 1.5 | 7.0 | 5.6 | 2.9 | 5.2 |
| | $NaHSO_3$ (calc. as $Na_2S_2O_5$) | " | 17.1 | 6.1 | 8.8 | 10.7 | 22.1 |
| | $Na_2SO_4$ | " | 81.2 | 86.9 | 85.6 | 86.4 | 72.7 |
| | $Na_2S_2O_3$ | " | 0.1 | Nil | Nil | Nil | Nil |
| | NaCl | " | 0.1 | Nil | Nil | Nil | — |
| Final Solids[2] | % wt | | 3.3 | 10.9 | 8.2 | 1.7 | — |

[1]Commercially obtained wet solids from main $SO_2$ desorber.
[2]Based on weight of spent absorber solution.

The data of Table I show the increase in sodium sulfate concentration obtained by the treatment with sulfur dioxide of an aqueous slurry of mixed solids containing sodium sulfate and sodium sulfite, see the increase in sulfate content in going from the first dry crystals to the second dry crystals in a given test. The second dry crystals contained considerable amounts of highly water-soluble sodium bisulfite, and the presence of the latter indicates that insufficient water was used in the sulfur dioxide treatment to keep all of the sodium bisulfite in solution. If the latter had been done the purity of the sodium sulfate should have exceed 90 or 95 percent in each test. Products of such purity could also have been obtained by washing of the second dry crystals with a limited amount of water to remove sodium bisulfite selectively.

It is claimed:

1. In a process for the removal of sulfur dioxide from gas in which sulfur dioxide is absorbed from the gas in an aqueous absorption solution of sodium sulfite to form bisulfite, resulting bisulfite-containing absorption solution is desorbed to generate sulfur dioxide, sulfite-containing desorption medium for recycling to said absorption is provided, and in which sodium sulfate is in the spent solution from said absorption, the improvement for removing sodium sulfate from the absorption-desorption system which comprises treating a portion of the absorption-desorption medium to precipitate mixed sodium sulfate and sodium sulfite solid particles in the aqueous medium, separting said solid particles from the resulting slurry, passing the mother liquor from said solid particles separation to the absorption-desorption system for removing sulfur dioxide from said gas, contacting an aqueous slurry containing said separated solid particles with a sulfur dioxide-containing gas at a temperature of about 40° to 110° C. to convert sodium sulfite into sodium bisulfite in the presence of an amount of water to dissolve sodium bisulfite formed and have sodium sulfate in a solid phase, and separating from said slurry purified sodium sulfate-containing solids having at least about 75 weight percent sodium sulfate based on total sulfate and sulfite and a liquid phase.

2. The process of claim 1 in which the absorption-desorption medium treated is spent absorption solution.

3. The process of claim 2 in which each of said sulfur dioxide-containing gases has a minor volume percent of sulfur dioxide.

4. The process of claim 1, 2 or 3 in which said separations are at temperatures of about 40° to 110° C.

5. The process of claim 4 in which said purified solids contain at least about 90 weight percent sodium sulfate based on total sulfate and sulfite.

6. The process of claim 1 in which said purified solids contain at least about 90 weight percent sodium sulfate based on total sulfate and sulfite, and at least about 25% more than in said slurry contacted with sulfur dioxide-containing gas.

7. A process of claim 1, 2, 3 or 6 in which said aqueous slurry contacted with a sulfur dioxide-containing gas has about 40 to 60% water.

8. A process of claim 7 in which said liquid phase is passed to the absorption-desorption system.

9. In a process for the removal of sulfur dioxide from gas in which sulfur dioxide is absorbed from the gas in an aqueous absorption solution of sodium sulfite to form bisulfite, resulting bisulfite-containing absorption solution is desorbed to generate sulfur dioxide, sulfite-containing desorption medium for recycling to said absorption is provided, and in which sodium sulfate is in the spent solution from said absorption, the improvement for removing sodium sulfate from the absorption-desorption system which comprises treating a portion of the spent absorption medium to precipitate mixed sodium sulfate and sodium sulfite solid particles in the aqueous medium, separating said solid particles from the resulting slurry, passing the mother liquor from said solid particles separation to the absorption-desorption system for removing sulfur dioxide from said gas, contacting an aqueous slurry containing said separated solid particles and about 40 to 60% water with a sulfur dioxide-containing gas at a temperature of about 40° to 110° C. to convert sodium sulfite into sodium bisulfite in the presence of an amount of water to dissolve sodium bisulfite formed and have sodium sulfate in a solid phase, separating from said slurry purified sodium sulfate-containing solids having at least about 75 weight percent sodium sulfate based on total sulfate and sulfite, and a liquid phase, and passing said liquid phase to the absorption-desorption system for removing sulfur dioxide from said gas.

10. The process of claim 9 in which said separations are at temperatures of about 40° to 110° C.

11. The process of claim 10 in which said purified solids contain at least about 90 weight percent sodium sulfate based on total sulfate and sulfite, and at least about 25% more than in said slurry contacted with sulfur dioxide-containing gas.

* * * * *